United States Patent
Biskeborn et al.

(10) Patent No.: US 8,797,682 B1
(45) Date of Patent: Aug. 5, 2014

(54) QUASI-STATICALLY TILTED MAGNETIC TAPE HEAD HAVING BACKWARD COMPATIBILITY

(71) Applicant: International Business Machines Corporation, Armonk, NY (US)

(72) Inventors: Robert G. Biskeborn, Hollister, CA (US); Calvin S. Lo, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/972,790

(22) Filed: Aug. 21, 2013

(51) Int. Cl.
G11B 5/127 (2006.01)

(52) U.S. Cl.
USPC .......................................... 360/121

(58) Field of Classification Search
CPC .......... G11B 5/265; G11B 5/33; G11B 5/127; G11B 21/02
USPC ............ 360/121, 122, 234.3, 125.35, 125.48, 360/125.01, 125.5; 29/603.14, 603.16, 29/603.03
See application file for complete search history.

(56) References Cited

U.S. PATENT DOCUMENTS

| | | | |
|---|---|---|---|
| 3,893,176 A | 7/1975 | Jones | |
| 3,924,268 A | 12/1975 | McIntosh et al. | |
| 5,060,210 A | 10/1991 | Fennema et al. | |
| 5,371,638 A | 12/1994 | Saliba | |
| 5,862,014 A | 1/1999 | Nute | |
| 6,038,108 A | 3/2000 | Dee et al. | |
| 6,130,804 A | 10/2000 | Panish et al. | |
| 6,188,532 B1 | 2/2001 | Albrecht et al. | |
| 6,188,535 B1 | 2/2001 | Lemke et al. | |
| 6,222,698 B1 | 4/2001 | Barndt et al. | |
| 6,339,793 B1 | 1/2002 | Bostian et al. | |
| 6,369,982 B2 | 4/2002 | Saliba | |
| 6,751,055 B1 | 6/2004 | Alfoqaha et al. | |
| 6,757,128 B2 | 6/2004 | Yip | |
| 6,781,784 B2 | 8/2004 | Peterson | |

(Continued)

FOREIGN PATENT DOCUMENTS

| | | |
|---|---|---|
| EP | 0 478 276 A2 | 4/1992 |
| EP | 0 883 120 A1 | 12/1998 |

(Continued)

OTHER PUBLICATIONS

U.S. Appl. No. 14/019,405, filed Sep. 5, 2013.

(Continued)

*Primary Examiner* — Allen T Cao
(74) *Attorney, Agent, or Firm* — Zilka-Kotab, PC

(57) ABSTRACT

In one general embodiment, an apparatus includes a magnetic head. The magnetic head has a first array of data transducers; a second array of data transducers spaced from the first array; and a third array of data transducers positioned between the first and second arrays. The magnetic head is positionable between a first position and a second position. A pitch of the data transducers of at least two of the arrays presented to the tape is compatible with a first format when the magnetic head is positioned between the first and second positions. The pitch of the data transducers of at least one of the arrays is compatible with a second format when the longitudinal axis of the third array is oriented about perpendicular to the intended direction of tape travel. A data track pitch of the first format is different than the data track pitch of the second format.

16 Claims, 16 Drawing Sheets

(56) References Cited

U.S. PATENT DOCUMENTS

| | | |
|---|---|---|
| 6,947,247 B2 | 9/2005 | Schwarz et al. |
| 7,193,812 B2 | 3/2007 | Eaton |
| 7,239,465 B1 | 7/2007 | Watson et al. |
| 7,480,117 B2 | 1/2009 | Biskeborn et al. |
| 7,486,464 B2 | 2/2009 | Saliba |
| 7,764,460 B2 | 7/2010 | Bates et al. |
| 7,952,832 B2 | 5/2011 | Biskeborn et al. |
| 8,054,576 B2 | 11/2011 | Bui et al. |
| 8,054,579 B2 | 11/2011 | Biskeborn |
| 8,094,402 B2 | 1/2012 | Bui et al. |
| 8,587,902 B2 * | 11/2013 | Biskeborn et al. ......... 360/241.1 |
| 2001/0015870 A1 | 8/2001 | Saliba |
| 2002/0163752 A1 | 11/2002 | Peterson |
| 2002/0186496 A1 | 12/2002 | Saliba et al. |
| 2005/0168865 A1 | 8/2005 | Simmons, Jr. et al. |
| 2006/0039082 A1 | 2/2006 | Biskeborn et al. |
| 2006/0126212 A1 | 6/2006 | Anderson et al. |
| 2006/0232884 A1 | 10/2006 | Biskeborn |
| 2007/0285838 A1 | 12/2007 | Hennecken et al. |
| 2008/0088963 A1 | 4/2008 | Biskeborn et al. |
| 2008/0158720 A1 | 7/2008 | Watson |
| 2008/0291566 A1 * | 11/2008 | Biskeborn et al. .............. 360/75 |
| 2009/0027803 A1 | 1/2009 | Biskeborn et al. |
| 2009/0128949 A1 | 5/2009 | Matsuno et al. |
| 2009/0174963 A1 | 7/2009 | Liang et al. |
| 2009/0213493 A1 | 8/2009 | Bui et al. |
| 2009/0219648 A1 | 9/2009 | Jaquette |
| 2009/0231756 A1 | 9/2009 | Koeppe |
| 2009/0231757 A1 | 9/2009 | Biskeborn et al. |
| 2009/0279205 A1 | 11/2009 | Hennecken |
| 2009/0316296 A1 | 12/2009 | Cherubini et al. |
| 2011/0002065 A1 | 1/2011 | Dugas et al. |
| 2011/0051283 A1 | 3/2011 | Harper et al. |
| 2011/0170214 A1 | 7/2011 | Bui et al. |
| 2011/0182157 A1 | 7/2011 | Hoerger |
| 2011/0199701 A1 | 8/2011 | Bui et al. |
| 2011/0310511 A1 | 12/2011 | Edelman et al. |
| 2012/0008234 A1 | 1/2012 | Biskeborn et al. |
| 2012/0200952 A1 | 8/2012 | Bui et al. |
| 2012/0206832 A1 | 8/2012 | Hamidi et al. |
| 2014/0036393 A1 * | 2/2014 | Biskeborn et al. ....... 360/123.17 |

FOREIGN PATENT DOCUMENTS

| | | |
|---|---|---|
| EP | 0 959 454 A2 | 11/1999 |
| EP | 1 030 300 A2 | 8/2000 |
| EP | 1 204 096 A2 | 5/2002 |
| JP | 2005/108412 A | 4/2005 |
| JP | 2006/172705 A | 6/2006 |
| KR | 1997050174 | 7/1997 |
| WO | 2007/093107 A1 | 8/2007 |
| WO | 2009/141231 A2 | 11/2009 |
| WO | 2010/047679 A1 | 4/2010 |
| WO | 2011/067052 A1 | 6/2011 |

OTHER PUBLICATIONS

U.S. Appl. No. 14/028,444, filed Sep. 16, 2013.
U.S. Appl. No. 14/105,082, filed Dec. 12, 2013.
U.S. Appl. No. 14/108,229, filed Dec. 16, 2013.
U.S. Appl. No. 13/875,226, filed May 1, 2013.
U.S. Appl. No. 13/875,230, filed May 1, 2013.
U.S. Appl. No. 13/875,231, filed May 1, 2013.
U.S. Appl. No. 13/890,155, filed May 8, 2013.
Wright, A. E., "Effects of Operating Parameters on Lateral Tape Motion for Magnetic Tape in an Advanced Linear Tape Drive," Thesis, The Ohio State Univ., 2006, pp. 1-104.
Argumedo et al., "Scaling tape-recording areal densities to 100 Gb/in2," 2008 IBM, IBM Journal of Research & Development, vol. 52, No. 4/5, Jul./Sep. 2008, pp. 513-527.
Childers et al., "Six orders of magnitude in linear tape technology: The one-terabyte project," IBM Journal of Research & Development, vol. 47, No. 4, Jul. 2003, pp. 471-482.
Biskeborn et al., "2.4 Tape Head Technology," International Magnetic Tape Storage Roadmap, May 2012, pp. 107-128.
Goldade et al., "Tape edge study in a linear tape drive with single-flanged guides," Journal of Magnetism and Magnetic Materials, vol. 271, 2004, pp. 409-430.
Beuch, We, "Magnetic Read Write Head Carriage Adjustment Procedure," IPCOM000071116D, Dec. 1, 1978, pp. 1-3.
Notice of Allowance and Fee(s) Due from U.S. Appl. No. 14/019,405 dated Apr. 10, 2014.

* cited by examiner

QUASI-STATICALLY TILTED MAGNETIC TAPE HEAD HAVING BACKWARD COMPATIBILITY

BACKGROUND

The present invention relates to data storage systems, and more particularly, this invention relates to a magnetic head and system implementing the same, where the head has offset arrays capable of reading data written in different storage formats.

In magnetic storage systems, data is read from and written onto magnetic recording media utilizing magnetic transducers. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, magnetic tape is moved over the surface of the tape head at high speed. Usually the tape head is designed to minimize the spacing between the head and the tape. The spacing between the magnetic head and the magnetic tape is crucial so that the recording gaps of the transducers, which are the source of the magnetic recording flux, are in near contact with the tape to effect writing sharp transitions, and so that the read element is in near contact with the tape to provide effective coupling of the magnetic field from the tape to the read element.

The quantity of data stored on a magnetic tape may be increased by increasing the number of data tracks across the tape. More tracks are made possible by reducing feature sizes of the readers and writers, such as by using thin-film fabrication techniques and MR sensors. However, for various reasons, the feature sizes of readers and writers cannot be arbitrarily reduced, and so factors such as lateral tape motion transients and tape lateral expansion and contraction (e.g., perpendicular to the direction of tape travel) must be balanced with reader/writer sizes that provide acceptable written tracks and readback signals. One issue limiting areal density is misregistration caused by tape lateral expansion and contraction. Tape width can vary by up to about 0.1% due to expansion and contraction caused by changes in humidity, tape tension, temperature, aging etc. This is often referred to as tape dimensional instability (TDI).

If the tape is written in one environment and then read back in another, the TDI may prevent the spacing of the tracks on the tape from precisely matching the spacing of the reading elements during readback. In current products, the change in track spacing due to TDI is small compared to the size of the written tracks and is part of the tracking budget that is considered when designing a product. As the tape capacity increases over time, tracks are becoming smaller and TDI is becoming an increasingly larger portion of the tracking budget and this is a limiting factor for growing areal density.

BRIEF SUMMARY

An apparatus according to one embodiment includes a magnetic head. The magnetic head has a first array of data transducers; a second array of data transducers spaced from the first array; and a third array of data transducers positioned between the first and second arrays. The magnetic head is positionable between a first position and a second position. A longitudinal axis of the third array is oriented at a first angle relative to a line oriented perpendicular to an intended direction of tape travel across the magnetic head when the magnetic head is in the first position. The longitudinal axis of the third array is oriented at a second angle relative to the line oriented perpendicular to the intended direction of tape travel when the magnetic head is in the second position. A pitch of the data transducers of at least two of the arrays presented to the tape is compatible with a first format when the magnetic head is positioned between the first and second positions. The pitch of the data transducers of at least one of the arrays is compatible with a second format when the longitudinal axis of the third array is oriented about perpendicular to the intended direction of tape travel. A data track pitch of the first format is different than the data track pitch of the second format.

A method according to one embodiment includes receiving a request to write data in a first format; orienting a magnetic head having first, second and third arrays of data transducers to a position such that a pitch of the data transducers of at least two of the arrays presented to a tape is compatible with the first format; writing data to the tape in the first format; receiving a request to read data in a second format, wherein a data track pitch of the first format is different than the data track pitch of the second format; orienting the magnetic head to a position such that a pitch of the data transducers of one of the arrays presented to the tape is compatible with the second format; and reading data in the second format from the tape.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

Figure 1A:
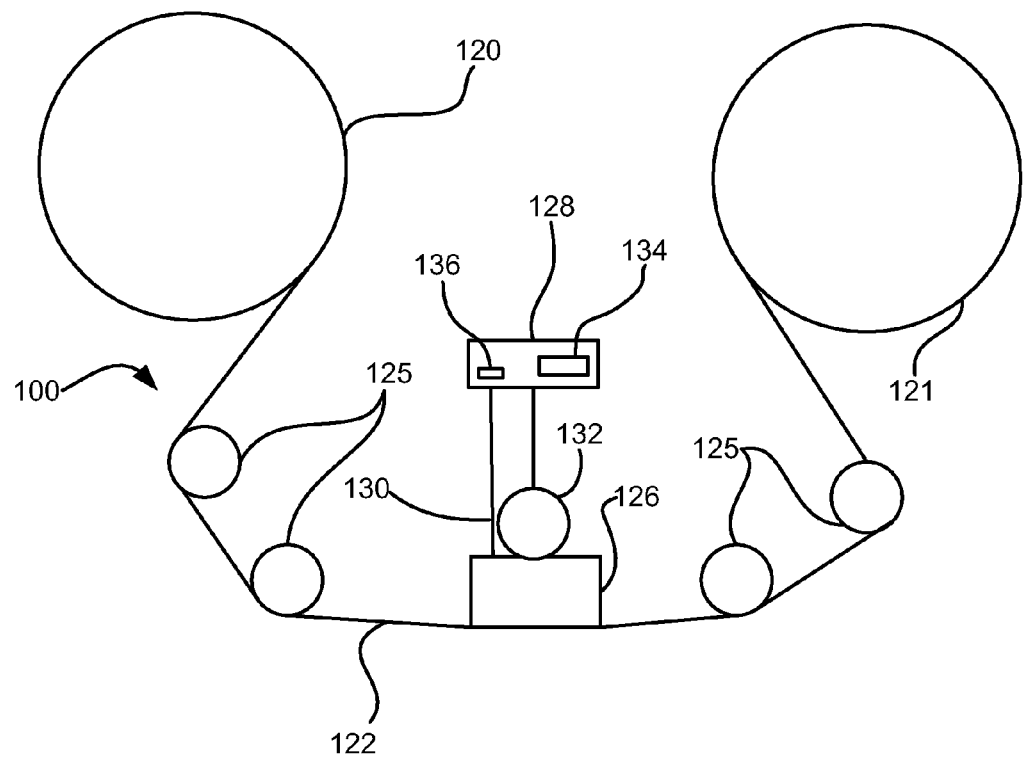
FIG. 1A is a schematic diagram of a simplified tape drive system according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems having the ability to accurately read data written in at least two different data storage formats, as well as operation and/or component parts thereof.

In one general embodiment, an apparatus includes a magnetic head. The magnetic head has a first array of data transducers; a second array of data transducers spaced from the first array; and a third array of data transducers positioned between the first and second arrays. The magnetic head is positionable between a first position and a second position. A longitudinal axis of the third array is oriented at a first angle relative to a line oriented perpendicular to an intended direction of tape travel across the magnetic head when the magnetic head is in the first position. The longitudinal axis of the third array is oriented at a second angle relative to the line oriented perpendicular to the intended direction of tape travel when the magnetic head is in the second position. A pitch of the data transducers of at least two of the arrays presented to the tape is compatible with a first format when the magnetic head is positioned between the first and second positions. The pitch of the data transducers of at least one of the arrays is compatible with a second format when the longitudinal axis of the third array is oriented about perpendicular to the intended direction of tape travel. A data track pitch of the first format is different than the data track pitch of the second format.

In another general embodiment, a method includes receiving a request to write data in a first format; orienting a magnetic head having first, second and third arrays of data transducers to a position such that a pitch of the data transducers of at least two of the arrays presented to a tape is compatible with the first format; writing data to the tape in the first format; receiving a request to read data in a second format, wherein a data track pitch of the first format is different than the data track pitch of the second format; orienting the magnetic head to a position such that a pitch of the data transducers of one of the arrays presented to the tape is compatible with the second format; and reading data in the second format from the tape.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may operate under logic known in the art, as well as any logic disclosed herein. The controller 128 may be coupled to a memory 136 of any known type, which may store instructions executable by the controller 128. Moreover, the controller 128 may be configured and/or programmable to perform or control some or all of the methodology presented herein. Thus, the controller may be considered configured to perform various operations by way of logic programmed into a chip; software, firmware, or other instructions being available to a processor; etc. and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (integral or external) to send and receive the data and for controlling the operation of the tape drive 100 and communicating the status of the tape drive 100 to the host, all as will be understood by those of skill in the art.

Figure 1B:
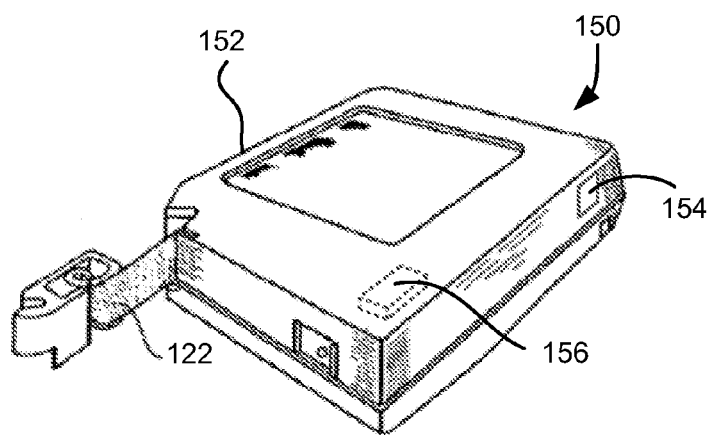
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
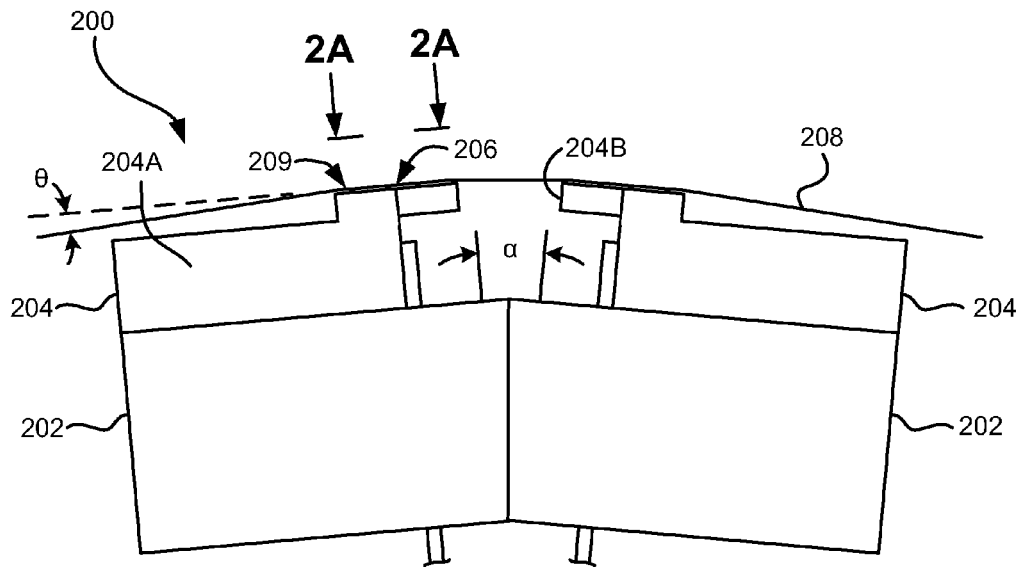
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 5 degrees.

The substrates 204A are typically constructed of a wear resistant material, such as a ceramic. The closures 204B made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
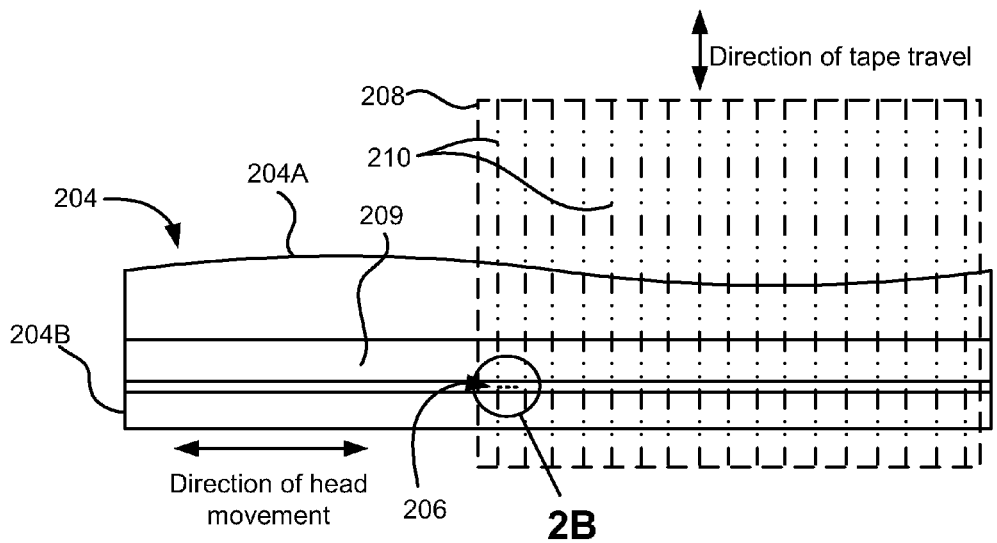
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 22 data bands, e.g., with 16 data bands and 17 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
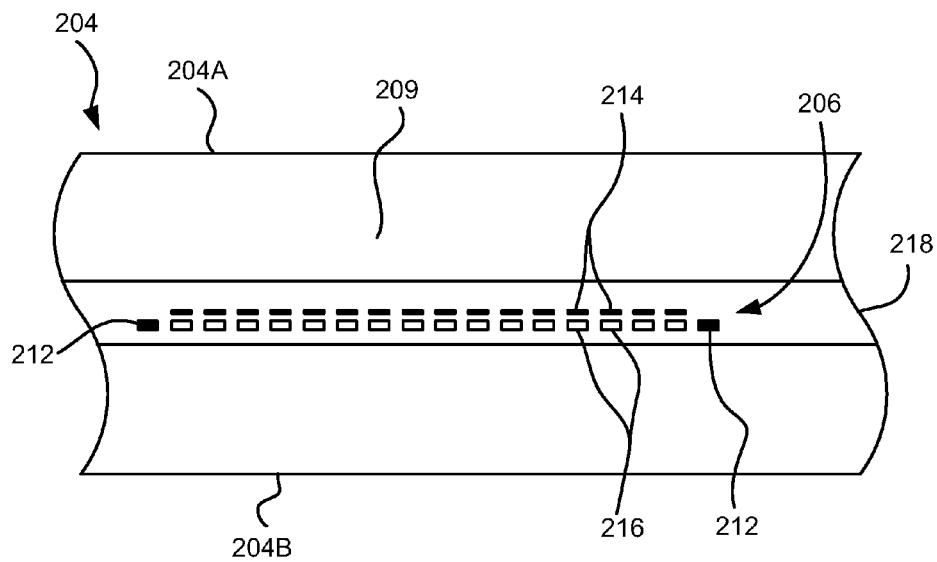
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/ or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
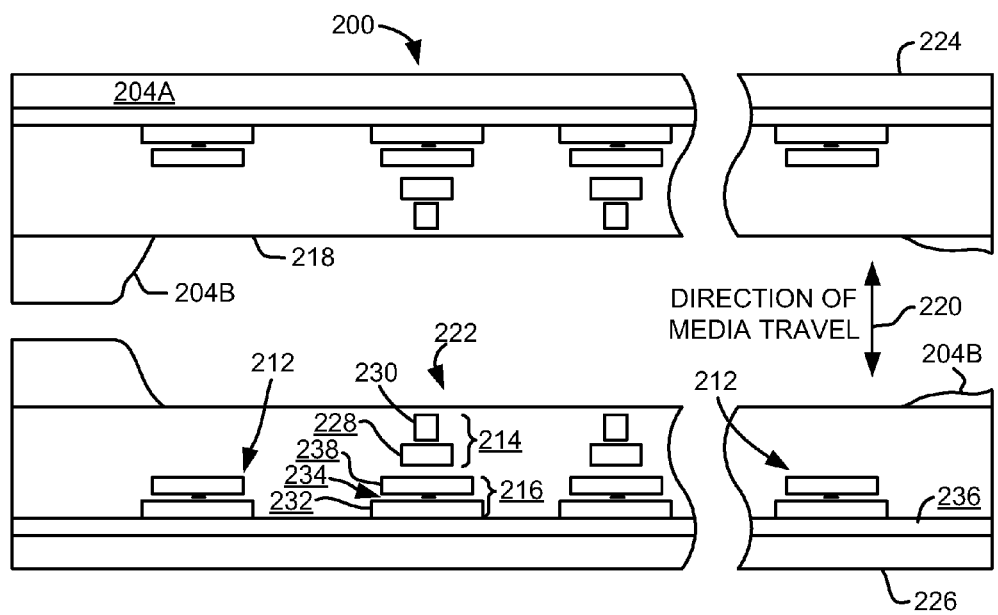
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write head 214 and the readers, exemplified by the read head 216, are aligned parallel to a direction of travel of a tape medium thereacross to form an R/W pair, exemplified by the R/W pair 222.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe, CZT or Al—Fe—Si (Sendust), a sensor 234 for sensing a data track on a magnetic medium, a second shield 238 typically of a nickel-iron alloy (e.g., ~80/ 20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
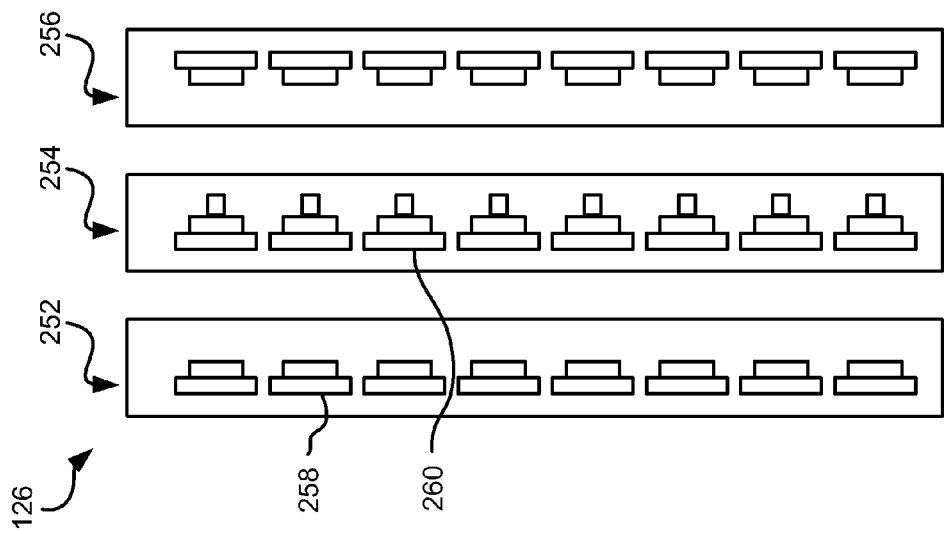
FIG. 4 is a partial tape bearing surface view of a magnetic head having a read-write-read configuration.
Figure 3:
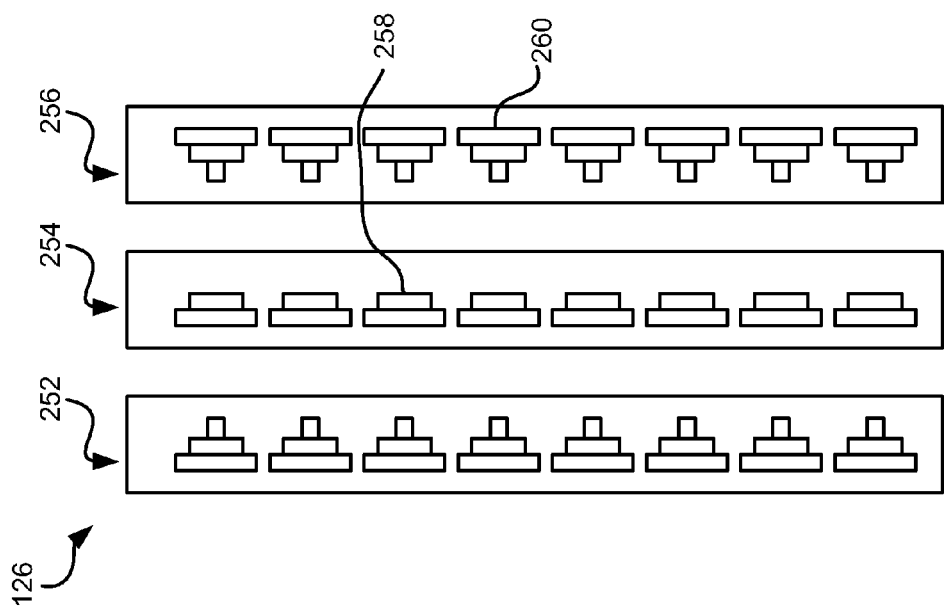
FIG. 3 is a partial tape bearing surface view of a magnetic head having a write-read-write configuration.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
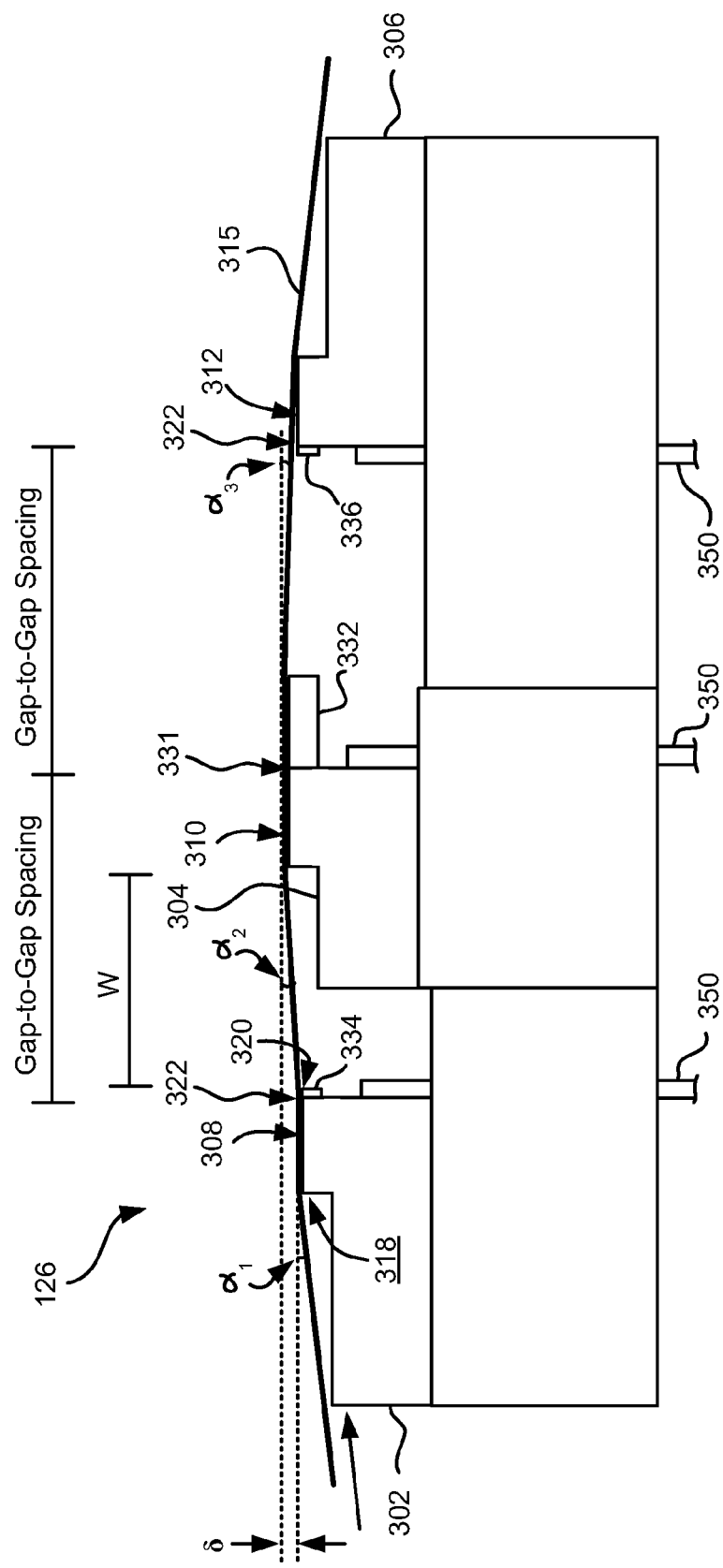
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
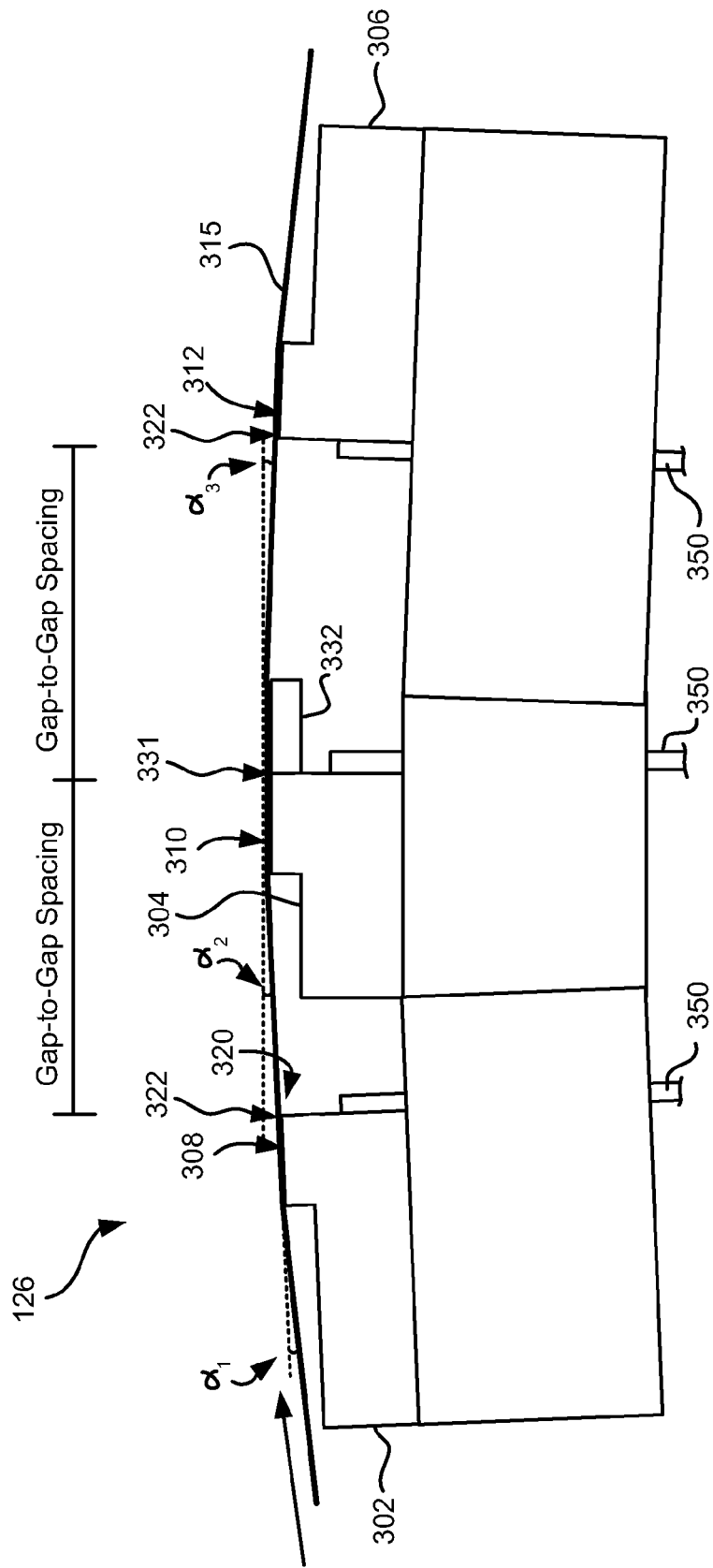
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.5° to about 1.1°, though can be any angle required by the design.

Beneficially, the inner wrap angle $\alpha_2$ may be set slightly less on the side of the module 304 receiving the tape (leading edge) than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle $\alpha t$ the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 25-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than standard LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $_2$ of the second module 304. In other words, the planes of the tape bearing surfaces 308, 312 of the outer modules 302, 306 are oriented at about the desired wrap angle $_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
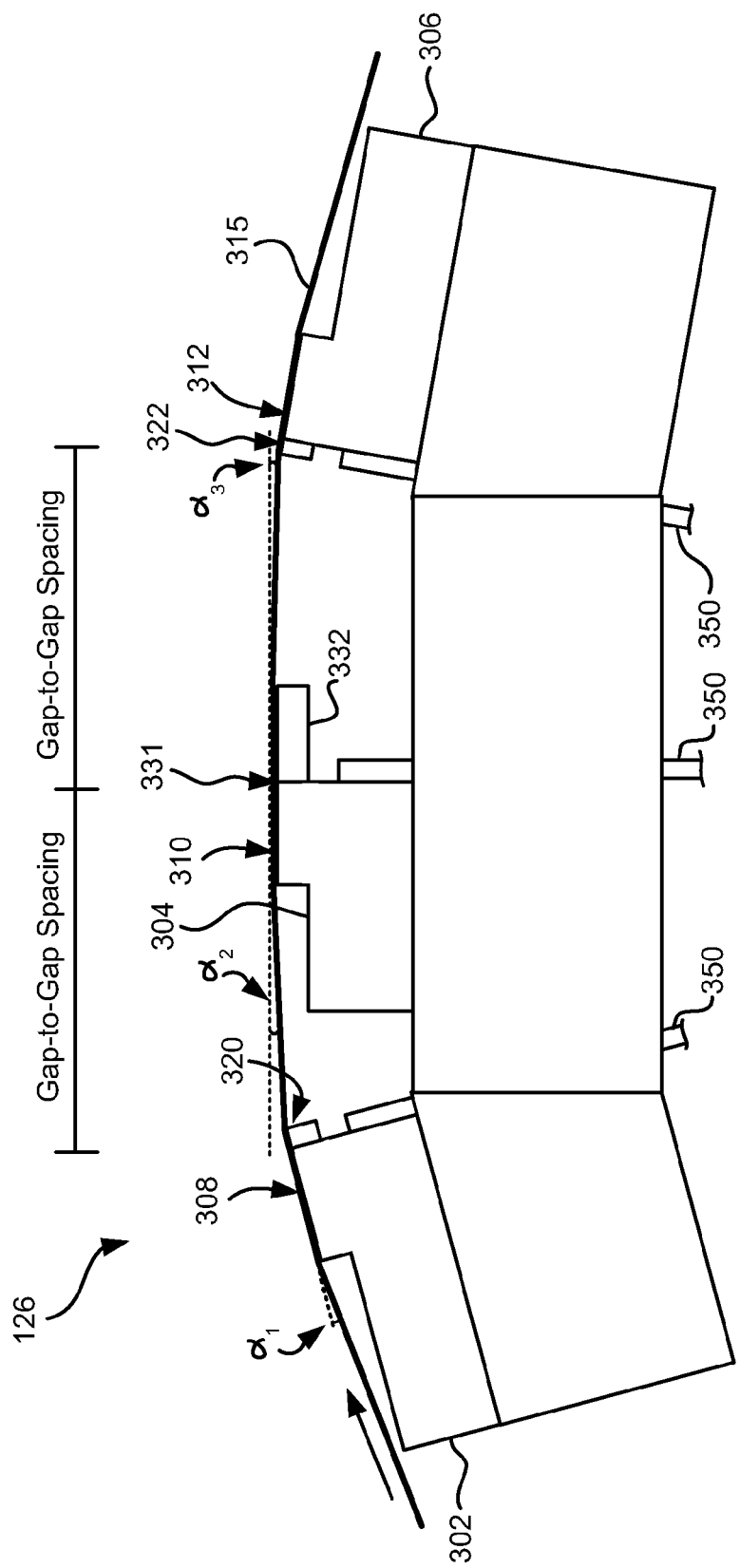
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures will force a wider gap-to-gap separation. Therefore a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same pitch as current 16 channel piggyback LTO modules, or alternatively the connections on the module may be organ-keyboarded for a 50% reduction in cable span. Over-under, writing pair unshielded cables can be used for the writers, which may have integrated servo readers.

The outer wrap angles $\alpha_1$ may be set in the drive, such as by guides of any type known in the art, such as adjustable rollers, slides, etc. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head can be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads.

As noted above, tape lateral expansion and contraction present many challenges to increasing data track density on conventional products. Conventional products have attempted to compensate for tape lateral expansion and contraction by reducing track pitch, controlling tape width by tension and improving the characteristics of the media itself. However, these methods fail to fully cancel the tape lateral expansion and contraction, and actually lead to other problems, including channel crosstalk, tape stretch and media cost increases, respectively.

Figure 8A:
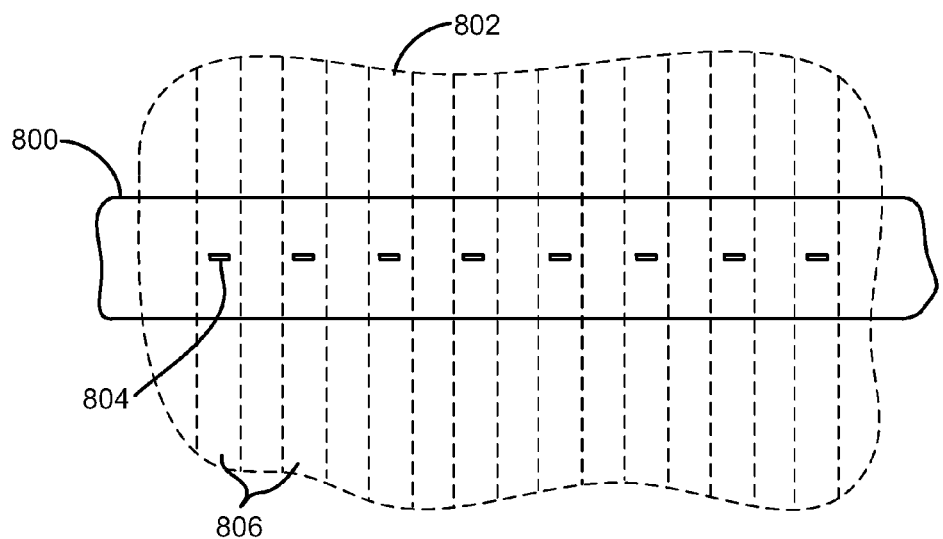
FIGS. 8A-8C are partial top-down views of one array of a magnetic tape head according to one embodiment.
Figure 8B:
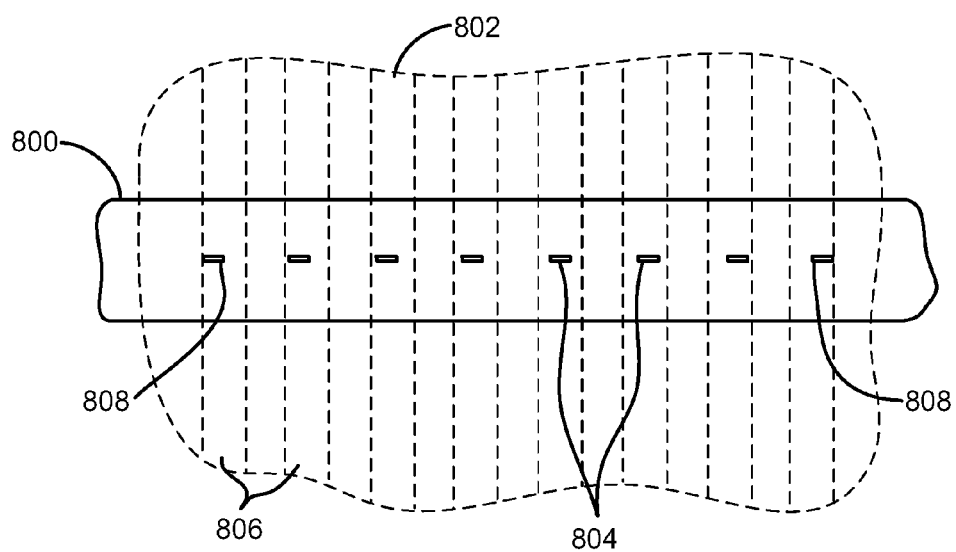
Figure 8C:
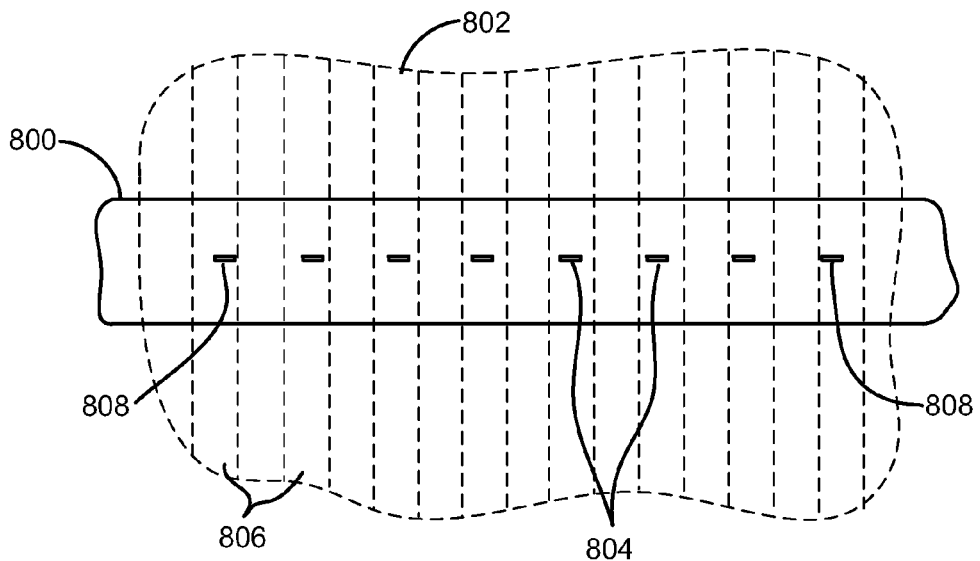

FIGS. 8A-8C are intended to depict the effect of tape lateral expansion and contraction on transducer arrays position relative thereto, and are in no way intended to limit the invention. FIG. 8A depicts an array 800 relative to the tape 802, where the tape has a nominal width. As shown, the transducers 804 are favorably aligned with the data tracks 806 on the tape 802. However, FIG. 8B illustrates the effect of tape lateral contraction. As shown, contraction of the tape causes the data tracks to contract as well, and the outermost transducers 808 are positioned along the outer edges of the outer data tracks as a result. Moreover, FIG. 8C depicts the effect of tape lateral expansion. Here expansion of the tape causes the data tracks to move farther apart, and the outermost transducers 808 are positioned along the inner edges of the outer data tracks as a result. If the tape lateral contraction is greater than that shown in FIG. 8B, or the tape lateral expansion is greater than that shown in FIG. 8C, the outermost transducers 808 will cross onto adjacent tracks, thereby causing the adjacent tracks to be overwritten during a writing operation and/or resulting in readback of the wrong track during a readback operation. Moreover, running effects, such as tape skew and lateral shifting may exacerbate such problems, particularly for tape having shingled data tracks.

Thus, it would be desirable to develop a tape drive system able to read and/or write tracks onto the tape in the proper position, regardless of the extent of tape lateral expansion and/or contraction at any given time. Various embodiments described and/or suggested herein overcome the foregoing challenges of conventional products, by orienting (equivalent to rotating, pivoting and/or tilting) at least three arrays of a tape drive system, thereby selectively altering the pitch of the transducers in their arrays, as will soon become apparent.

By selectively orienting a module, the pitch of the transducers on the module is thereby altered, preferably aligning the transducers with the tracks on a tape for a given tape lateral expansion and/or contraction. Tape contraction (shrinkage) can be dealt with by orienting a nominally non-offset head, but tape expansion (dilation) cannot. Thus, to accommodate both shrinkage and dilation about a "nominal," the head may be statically oriented to a nominal angle of at least approximately 0.2° as will be explained below. Thereafter, smaller angular adjustments (e.g., about 1° or lower, but could be more) may be made to the already oriented module in order to compensate for any variation of the tape lateral expansion and/or contraction, thereby keeping the transducers aligned with tracks on the tape.

Figure 9A:
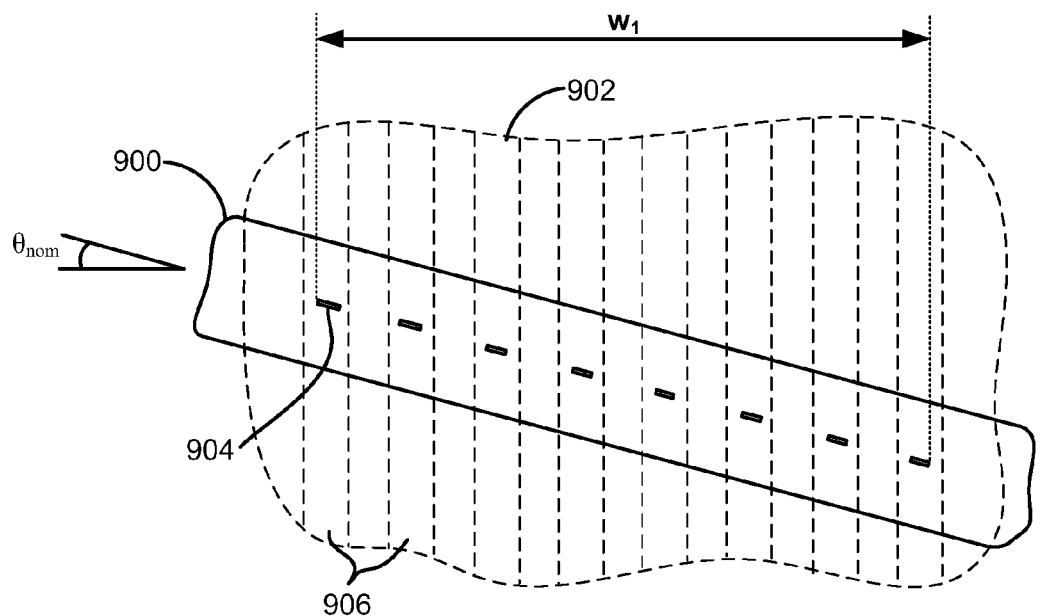
FIGS. 9A-9C are partial top-down views of one array of a magnetic tape head according to one embodiment.
Figure 9B:
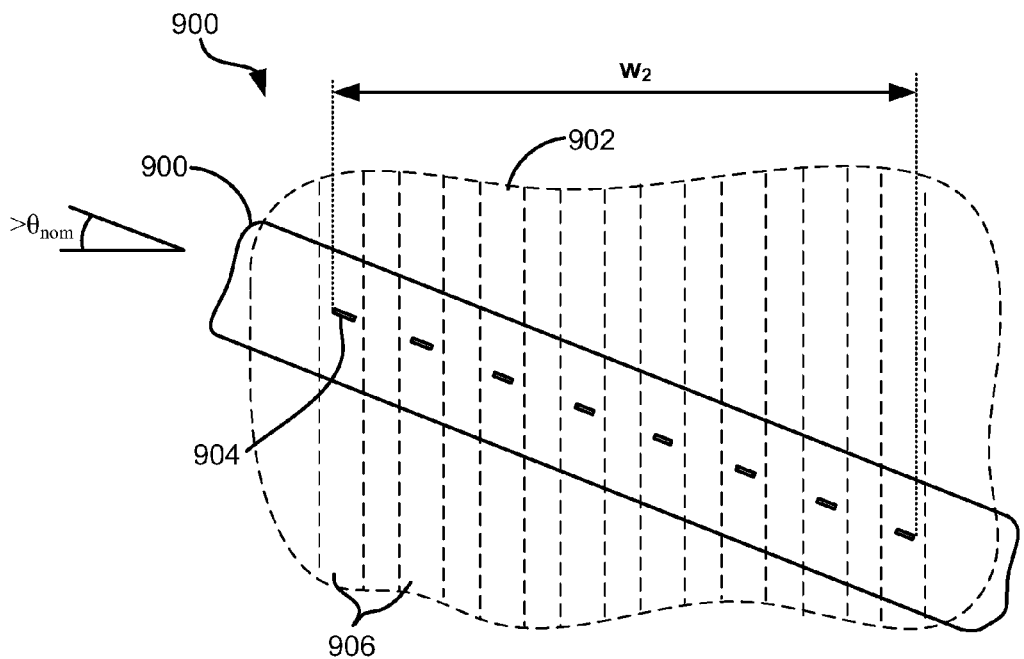
Figure 9C:
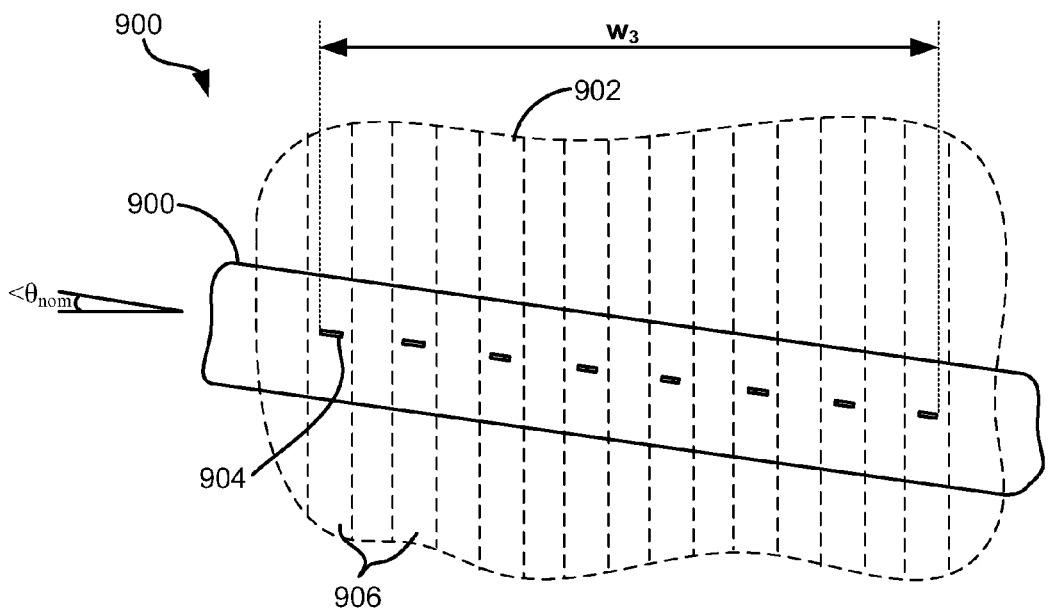

FIGS. 9A-9C illustrate representational views of the effects of orienting an array having transducer arrays. It should be noted that the angles of orientation illustrated in FIGS. 9A-9C are exaggerated (e.g., larger than would typically be observed), and are in no way intended to limit the invention.

Referring to FIG. 9A, the array 900 is shown relative to the tape 902, where the tape has a nominal width. As illustrated, the array 900 is oriented at an angle $\theta_{nom}$ such that the transducers 904 are favorably aligned with the data tracks 906 on the tape 902. However, when the tape 902 experiences tape lateral contraction and/or expansion, the data tracks 906 on the tape contract and/or expand as well. As a result, the transducers on the array are no longer favorably aligned with the data tracks 906 on the tape 902.

In FIG. 9B, the tape 902 has experienced tape lateral contraction. Therefore, in a manner exemplified by FIG. 8B, the transducers 904 on the array 900 of FIG. 9B would no longer be favorably aligned with the data tracks 906 on the tape 902 if no adjustment were made. However, as alluded to above, smaller angular adjustments may be made to the already oriented array 900 in order to compensate for tape lateral contraction. Therefore, referring again to FIG. 9B, the angle of orientation $>\theta_{nom}$ of the array 900 is further oriented to an angle greater than $\theta_{nom}$. By increasing the angle of orientation $>\theta_{nom}$ the effective width $w_2$ of the array of transducers decreases from the effective width $w_1$ illustrated in FIG. 9A. This also translates to a reduction in the effective pitch between the transducers, thereby realigning the transducers along the contracted data tracks 906 on the tape 902 as shown in FIG. 9B.

On the other hand, when the tape experiences tape lateral expansion, the data tracks on the tape expand as well. As a result, the transducers on the array would no longer be favorably aligned with the data tracks on the tape if no adjustments were made. With reference to FIG. 9C, the tape 902 has experienced tape lateral expansion. As a result, further angular adjustments may be made to the angle of orientation of the array in order to compensate for the tape lateral expansion. Therefore, referring again to FIG. 9C, the angle of orientation $<\theta_{nom}$ of the array 900 is reduced to an angle less than $\theta_{nom}$. By decreasing the angle of orientation $<\theta_{nom}$ the effective width $w_3$ of the array of transducers 904 increases from the effective width $w_1$ illustrated in FIG. 9A. Moreover, reducing the effective width of the array of transducers 904 also causes the effective pitch between the transducers to be reduced, thereby realigning the transducers along the data tracks 906 on the tape 902.

In a preferred approach, magnetic tape systems have three or more arrays, each having an array of transducers, typically in a row. Depending on the desired embodiment, the three or more arrays may allow for the system to accurately write data to a magnetic medium in a serpentine or non-serpentine fashion, as well as read back the data thereafter (explained in further detail below).

As mentioned above, the foregoing conventional challenges may be overcome by orienting a given array of transducers, or group of arrays, thereby selectively altering the pitch of the transducers in the arrays to achieve such desired functionality and compensating for tape dimension instability (TDI). Additionally, by incorporating arrays of transducers having a predetermined spacing between each of the transducers (also referred to herein as a center to center pitch of the transducers), further embodiments described herein may preferably be compatible with at least two data track formats, e.g., may be able to read data written in at least two different data track formats as will be discussed in further detail below.

Figure 10A:
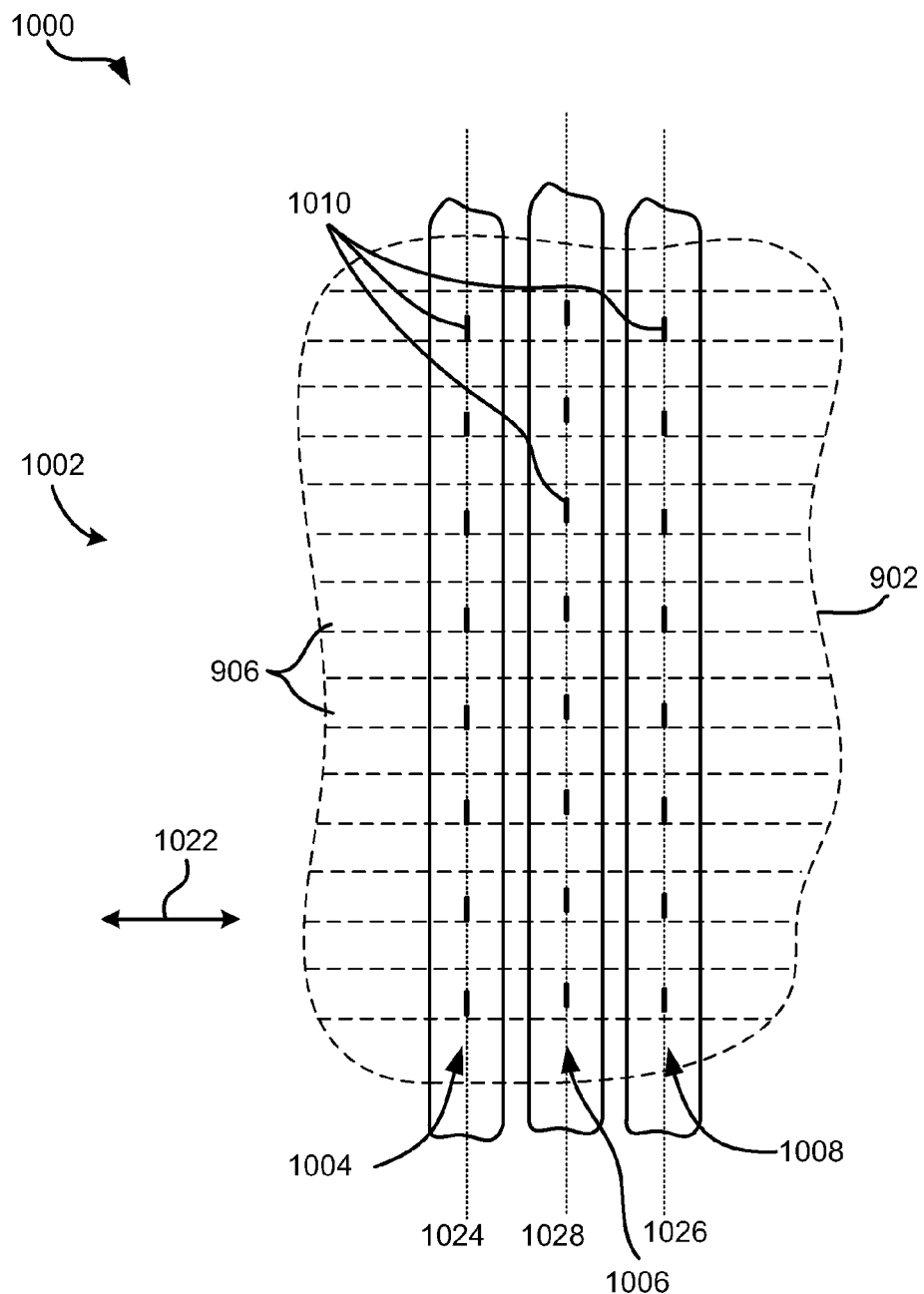
FIGS. 10A-10C are partial top-down views of a system with three arrays according to one embodiment.
Figure 10B:
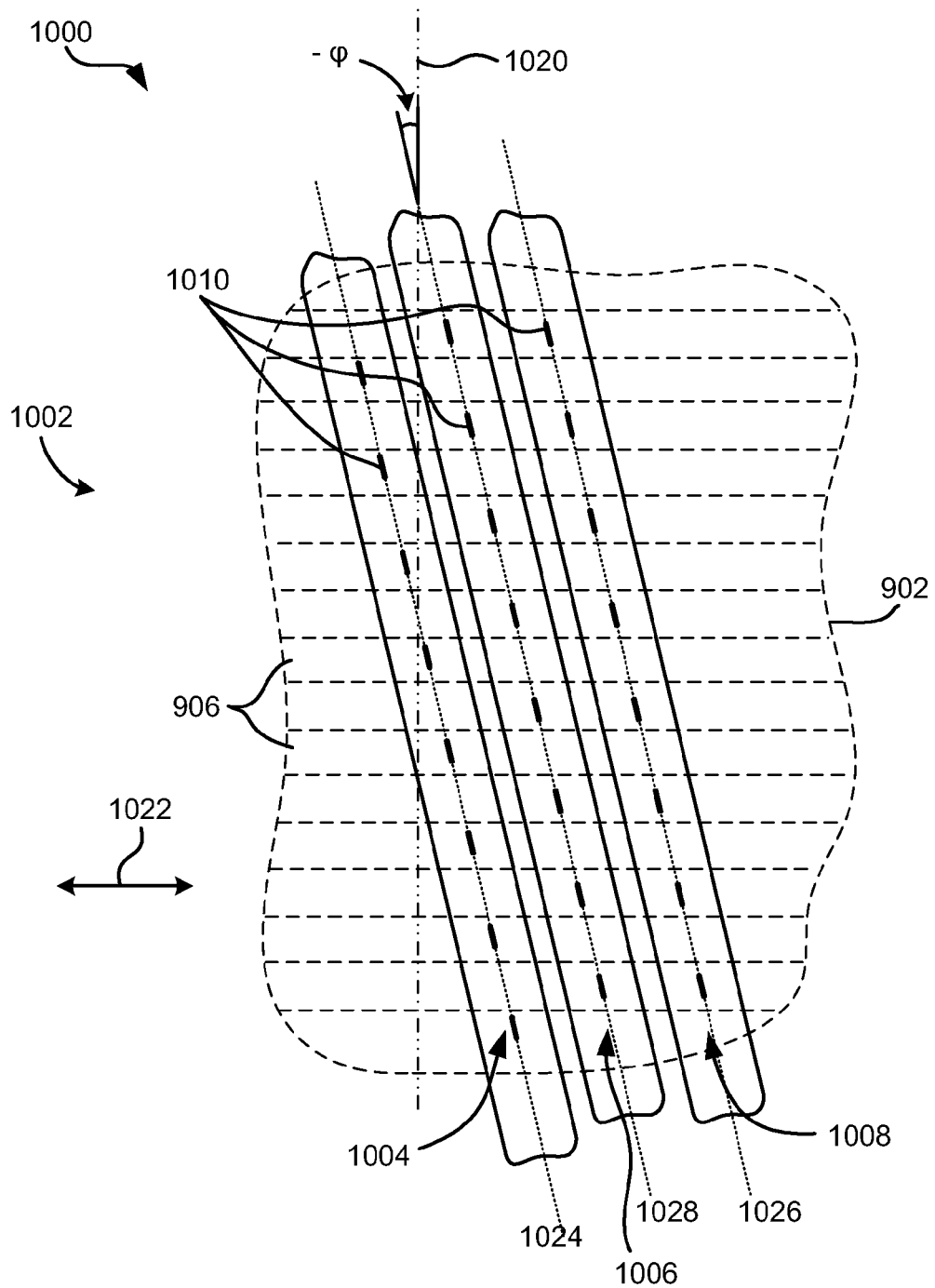
Figure 10C:
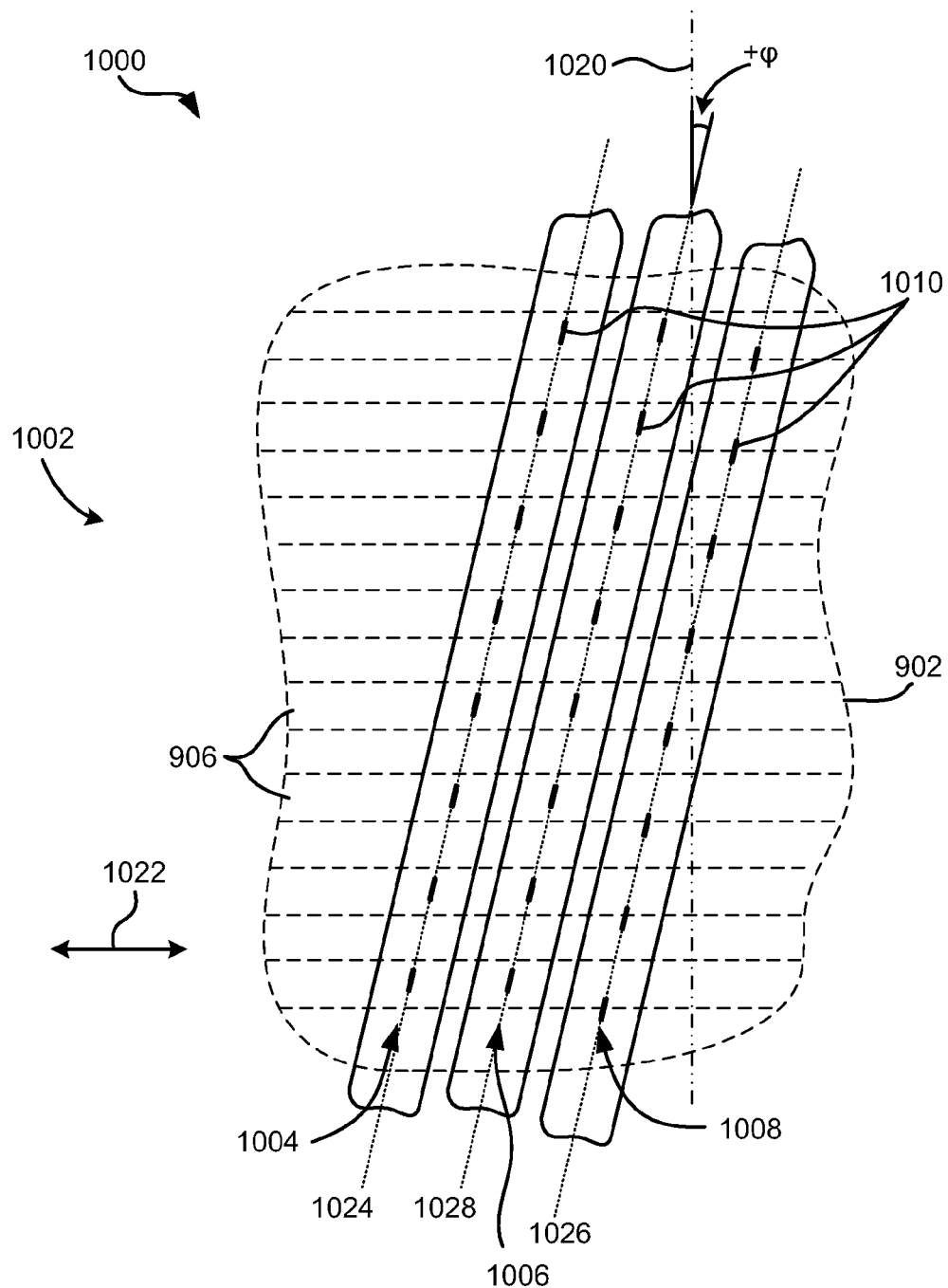

FIGS. 10A-10C depict an apparatus 1000, in accordance with one embodiment. As an option, the present apparatus 1000 may be implemented in conjunction with features from any other embodiment listed herein, such as those described with reference to the other FIGS. Of course, however, apparatus 1000 and others presented herein may be used in various applications and/or in permutations which may or may not be specifically described in the illustrative embodiments listed herein. Further, the apparatus 1000 presented herein may be used in any desired environment.

Referring now to FIGS. 10A-10C, the apparatus 1000 includes a magnetic head 1002, which has first, second and third arrays 1004, 1008, 1006 of data transducers 1010. As illustrated the second array 1008 of data transducers is preferably spaced form the first array 1004 of data transducers. Moreover, the third array 1006 of data transducers is positioned between the first and second arrays 1004, 1008 of data transducers 1010. The spacing between the arrays may preferably be minimized, but according to various approaches, may include any spacing configuration that would be apparent to one skilled in the art upon reading the present description. Each of the arrays may be on an individual module, e.g., as shown in FIGS. 3-7, may be formed on a common substrate, etc.

In a preferred approach, the data transducers 1010 of the first and second arrays 1004, 1008 may be of the same type, e.g., either readers or writers in both arrays, piggyback or merged transducers in both arrays, etc. This favorably allows the magnetic head 1002 the ability to read and/or write, as well as read-verify-while write, in both directions of tape travel 1022, as will soon become apparent. Moreover, the data transducers of the third array may preferably be different than those of the data transducers of the first and second arrays, thereby allowing the magnetic head to read-verify during the write process. Thus, according to the embodiment illustrated in FIGS. 10A-10C, the data transducers 1010 of the first and second arrays 1004, 1008 preferably include writers, while the data transducers of the third array 1006 preferably include readers. However, in another approach, the data transducers of the first and second arrays 1004, 1008 may include readers, while the data transducers 1010 of the third array 1006 may include writers. In such approach, the direction of tape travel 1022 shown in FIGS. 10B and 10C would be opposite that shown.

With continued reference to the exemplary embodiment illustrated in FIGS. 10A-10C, the magnetic head 1002 is preferably positionable, e.g., via pivoting, rotation, etc., between a first position (FIGS. 10A and/or 10B) and a second position (FIG. 10C), inclusive. In other words, the longitudinal axis 1028 of the third array 1006 may be oriented at a first angle (e.g., 0 as in FIG. 10A, or $-\phi$ in FIG. 10B) relative to a line 1020 oriented perpendicular to an intended direction 1022 of tape travel across the magnetic head 1002 when the magnetic head 1002 is in the first position, and at a second angle (e.g., $\phi$ in FIG. 10C) relative to the line 1020 oriented perpendicular to the intended direction 1022 of tape travel when the magnetic head 1002 is in the second position. Moreover, according to different approaches, the magnetic head 1002 may be oriented at any angle between, and/or at, the first and second angles of the first and second positions respectively, depending on the desired embodiment.

Referring still to FIGS. 10A-10C, depending on the direction of tape travel, the transducer layout, and/or extent of tape lateral expansion or contraction, the magnetic head 1002 may be positioned towards the first position to read and/or write to the tape 902. This allows the apparatus to control the effective transducer pitch presented to the tape, where the pitch as presented to the tape is measured perpendicularly to the intended tape travel direction 1022 between imaginary parallel lines extending through the data transducers 1010 along the tape travel direction 1022. Therefore, depending on the angular orientation of the magnetic head 1002 relative to data tracks 906 of a tape 902, the pitch of the transducers 1010, as presented to the tape 902, may be adjusted (e.g., tuned) depending on the center to center pitch of the data tracks 906 of the tape 902 as explained above with reference to FIGS. 9A-9C.

With continued reference to FIGS. 10A-10C, according to one approach, a center to center pitch of the data transducers 1010 of one or more of the arrays 1004, 1006, 1008 presented to the tape 902, may be compatible with a first format when the magnetic head 1002 is positioned between the first and second positions at some angle (±φ) that compensates for TDI. In other words, the pitch of the transducers 1010 of one or more of the arrays 1004, 1006, 1008 as presented to the tape 902 may be about the same as (i.e., compatible with) the center to center pitch of the data tracks 906 of a first format. See, e.g., FIGS. 10B and 10C. Note that in other approaches, the tape may be written and read bidirectionally when the head is positioned towards a second position, e.g., as shown in FIG. 10C. However, for explanatory purposes, the following description describes a head that pivots across both positive and negative angles (±φ).

Looking now to FIG. 10B, as alluded to above, when the head 1002 is towards or in a first position, according to an exemplary embodiment, the longitudinal axis 1028 of the third array 1006 may have a negative angle −φ relative to a line 1020 oriented perpendicular to an intended direction of tape travel 1022 thereacross. Thus, when the magnetic head 1002 is positioned towards the first position, the outer data transducers of the third array 1006 are about aligned with outer data transducers of the second array 1008, as illustrated. Moreover, the outer data transducers of the third and second arrays may preferably be aligned such that they are within the data tracks 906 on the tape 902, as illustrated. According to various approaches, when the head is positioned towards the first position, the negative angle −φ may be between less than 0 and about −4°, more preferably between less than 0 and about −6°, and ideally between less than 0 and about −8°.

With reference now to FIG. 10C, when the magnetic head 1002 is in or towards the second position, according to an exemplary embodiment, the longitudinal axis 1028 of the third array 1006 has a positive angle +φ relative to the line 1020 oriented perpendicular to the intended direction of tape travel 1022 thereacross. Thus, when the magnetic head 1002 is positioned towards the second position, the outer data transducers of the third array 1006 are about aligned with outer data transducers of the first array 1004, as shown. Furthermore, the outer data transducers of the third and first arrays are preferably aligned such that they are within the data tracks 906 on the tape 902, as illustrated. According to various approaches, when the head is positioned towards the second position, the positive angle +φ may be between greater than 0 and about 4°, more preferably between greater than 0 and about 6°, and ideally between greater than 0 and about 8°.

Although the first position and second position may correspond to the longitudinal axis 1028 of the third array 1006 being positioned at nonzero angles relative to a reference line 1020 oriented perpendicular to the intended direction 1022 of tape travel as explained above, according to other approaches, the center to center pitch of the data transducers 1010 of one or more of the arrays 1004, 1006, 1008 are also compatible with a second format, having a different data track pitch than that of the first format, when the longitudinal axis 1028 of the third array 1006 is oriented about perpendicular to the intended direction 1022 of tape travel.

The following assumes that the transducers 1010 of the third array 1006 are readers, and are used for readback operations compliant with the second format. Equivalently, the transducers of the first and/or second array 1004, 1008 may have readers that may be used to read data in the second format.

Thus, according to some embodiments, when the magnetic head 1002 is in a first position, or between the first and second positions, the longitudinal axis 1028 of the third array 1006 may be oriented about perpendicular to the intended direction 1022 of tape travel, e.g., as shown in FIG. 10A. Although the transducers 1010 of the third array 1006 may be able to read data tracks 906 of a second format, in some embodiments, the pitch of the transducers 1010 of the third array 1006 may not be the same as the pitch of the data tracks 906 of the second format. For example, according to some approaches, the transducers 1010 of the third array 1006 may be able to read data tracks 906 of a second format when the pitch of the transducers of the third array 1006 are about 85% to about 115% of the pitch of the data tracks 906 of the second format. However, in other embodiments the pitch of the transducers 1010 of the third array 1006 may be able to read data tracks 906 of a second format when the pitch of the transducers of the third array 1006 are the same as the pitch of the data tracks 906 of the second format, e.g., from about 95% to about 105% of the pitch of the data tracks 906 of the second format.

Furthermore, in such embodiments where the first position is associated with the longitudinal axis 1028 of the third array 1006 being oriented about perpendicular to the intended direction 1022 of tape travel, the positions of the transducers 1010 of each of the arrays may be adjusted accordingly, e.g., such that the transducers of the first and second arrays 1004, 1008 may align with the transducers 1010 of the third array 1006 to read and/or write in a first format when the magnetic head 1002 is positioned towards the second position thereof. Thus, as described above, the transducers 1010 of the apparatus 1000 may be able to read data written, and/or write data, with different center to center data track pitches, by positioning the magnetic head 1002 at different angular orientations between a first and a second position, inclusive.

In preferred approaches, the data transducers 1010 of the one or more of the arrays 1004, 1006, 1008 compatible with the second format are data readers. For example, if the transducers 1010 of the first and third arrays 1004, 1006 included readers, while the transducers 1010 of the second array 1008 include writers, the readers of the first and second arrays 1004, 1008 are preferably compatible with the second format. However, according to another example, if the transducers 1010 of the first and third arrays 1004, 1006 are writers, and the transducers 1010 of the third array 1006 include readers, the readers of the third array 1006 are preferably compatible with the second format.

The position of the head between the first and second positions may be selectable, and in some approaches continuously or periodically adjusted, based at least in part on any desirable factor. In one approach, the extent of the angular orientation of the head towards the first and/or second position may be made based on an extent of tape lateral expansion or contraction, e.g., in a similar manner to that described above with reference to FIGS. 9A-9C. Additional factors that may be used to determine the angle of orientation of the head may include detection of tape skew, direction of tape travel, etc.

Where the head is pivoted to set its angle of orientation, the center of pivot of the head 1002 may extend through the module of the first, second or third arrays, or some point in between, with the head pivoting about an axis approximately orthogonal to the plane of the tape surface. For example, the pivot point may align with an intersection of the center of the first array 1004 and the axis 1024 of the first array. The position of the head may be adjusted using the actuator as necessary to position the active arrays over the appropriate tracks, e.g., based on servo or other signals.

In addition, the inventors have surprisingly and unexpectedly found that the various embodiments described below enable writing and reading that does not notably steer the tape or cause media damage over the life of the tape. For example, the inventors expected that wrapping the tape over angled skiving edges would steer the tape laterally.

Angles of orientation greater than within a specified range (e.g., greater than about 10°) may be undesirable as the higher angles cause steering of the tape. However, the angles of orientation within the specified range unexpectedly and unforeseeably did not result in steering of the tape. Moreover, it is more difficult to distinguish between tape lateral expansion and/or contraction and skew when angles of orientation of the modules is greater than within the specified range. This may cause difficulties when matching the dimensional conditions of the tape and/or titling state of the modules of the current operation to that of the previous operation (explained in further detail below). It should also be noted that the angle of orientation $\phi$ illustrated in FIG. 10B is exaggerated (e.g., larger than within the desired range), and is in no way intended to limit the invention.

It is preferable that, while writing data to adjoining data tracks, especially shingled data tracks, the same writer array is used for the adjoining data tracks. Different writer arrays are not typically identical, as they have different alignment characteristics, and therefore write data differently. For example, the write transducers of one writer array may not have the same pitch, spacing, etc. as the write transducers of another writer array. Thus, using multiple writer arrays to write data to adjoining data tracks may result in readback errors, as the data written to the tracks may be aligned differently on each pass. According to another example, using different writer arrays may result in overwriting data on an adjoining track, thereby causing data loss.

As a result, according to different embodiments, configurations having three arrays, e.g., Writer-Reader-Writer (WRW) or Reader-Writer-Reader (RWR), the head may preferably be oriented, e.g., to points between the first and second positions, reversibly as the tape direction is reversed while writing. This preferably ensures that the same writer array is used to write adjoining shingled data tracks, thereby minimizing future readback errors and enabling more symmetrical servo pattern reading, e.g., by performing more symmetrical shingled writing as will soon become apparent.

Figure 12:
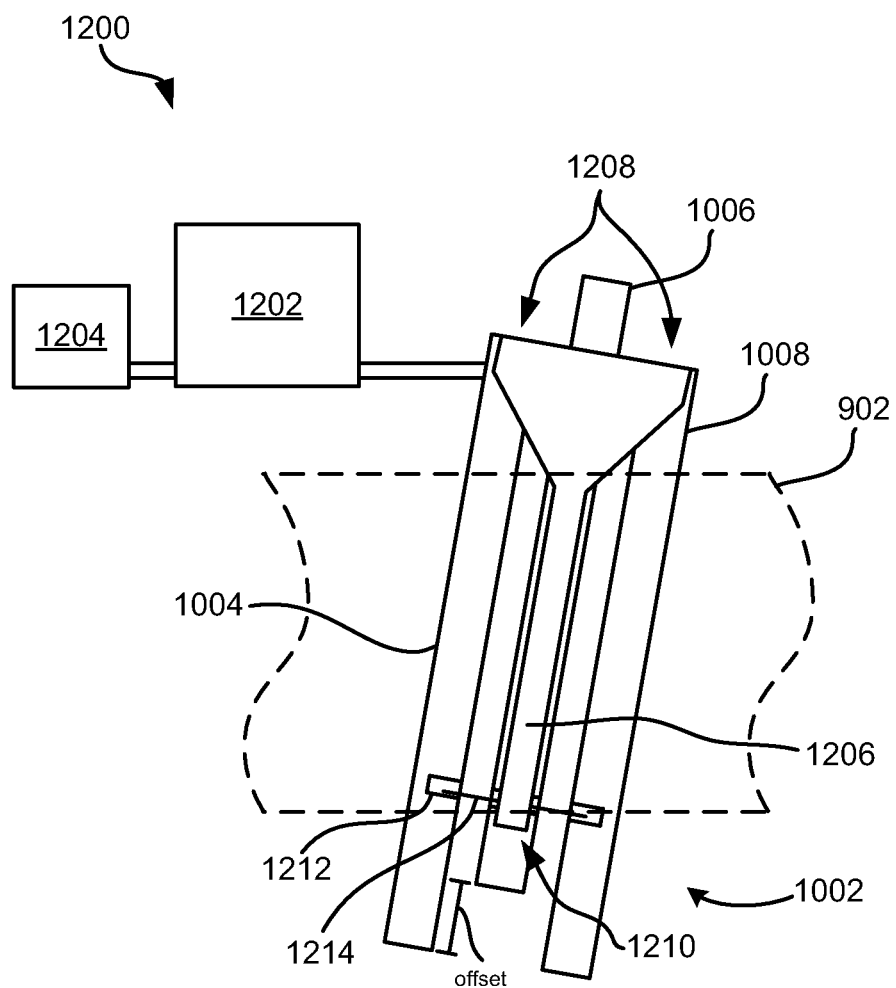
FIG. 12 is a diagram of one embodiment of the system of FIGS. 10A-10C.

With continued reference to FIGS. 10A-10C, the apparatus 1000 may include a controller (see, e.g., 128 of FIG. 1, 1204 of FIG. 12). According to one approach, the controller may be configured to write data, using the head, in a serpentine fashion. Moreover, according to another approach, the controller may be configured to write data, using the head, in a non-serpentine, e.g., linear azimuthal fashion, as will soon become apparent.

According to an illustrative approach, the arrays 1004, 1008, 1006 may preferably have a RWR configuration (e.g., the data transducers of the first and second arrays 1004, 1008 include readers, wherein the data transducers 1010 of the third array 1006 include writers) for conducting non-serpentine writing. Non-serpentine writing preferably includes the arrays being oriented between a positive and negative angle for the two intended directions of tape travel as explained above. Moreover, the RWR configuration ensures that the same array 1008 writes adjacent tracks. Readers in the trailing array may be used to read-verify the written data.

Again, using a RWR configuration for non-serpentine writing allows the same writer array to write each adjoining data track, despite reversal of the tape direction while writing thereto. This may reduce writing errors, readback errors, data loss, etc., as well as reducing the misregistration budgeting requirements, as only one set of track tolerances comes into play. Moreover, using the same writer array to write adjoining data tracks ensures consistency while writing (e.g., by enabling symmetrical servo pattern reading), overall higher areal density, etc.

Figure 11A:
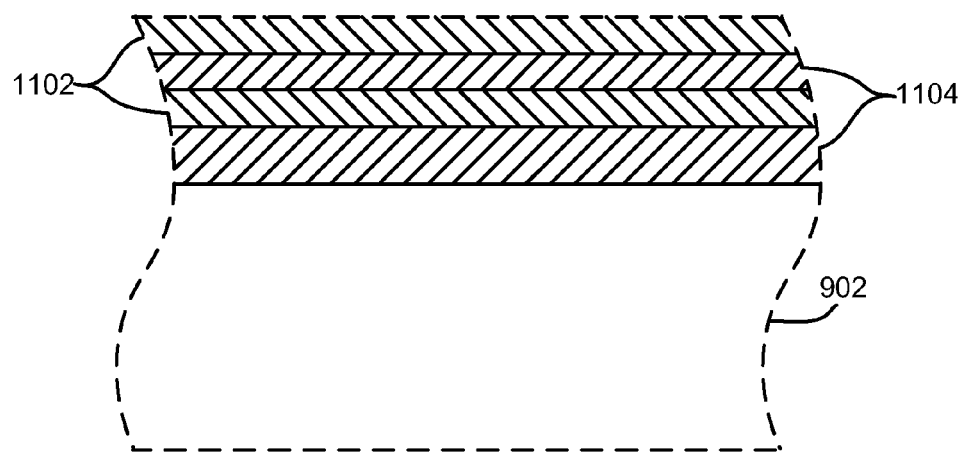
FIG. 11A is a diagram of a tape with shingled tracks written in a non-serpentine fashion according to one embodiment.

Thus, as illustrated in the representational diagram of FIG. 11A, which is in no way intended to limit the invention, the angles of orientation of the magnetic transitions on the tape 902 may be different such that the magnetic transitions written in the shingled data tracks 1102 in one direction are at a different angle than the magnetic transitions in shingled data tracks 1104 written in the opposite direction. Moreover, when reading a data track, the reader array may be oriented to about match the angle of the written transitions of each shingled data track to read the data thereon. Thus, if the reader array drifts over one of the adjacent data tracks, the off-track reading rejection SNR is higher, because the angle of orientation of the magnetic transitions on the adjacent data track will not match the angle of orientation of the read array.

Note that, while not ideal, a WRW configuration could be used for non-serpentine writing in some approaches.

Referring again to FIGS. 10A-10C, according to another illustrative approach, the arrays may have a WRW configuration (e.g., the data transducers 1010 of the first and second arrays 1004, 1008 may include writers, wherein the data transducers of the third array 1006 may include readers), for conducting serpentine writing. While writing data with a WRW configuration, the leading writer and reader may preferably be active, while the trailing writer is not active, depending on the intended direction of tape travel. As a result, the leading writer array may be used to write adjoining data tracks for one direction of tape travel, while the trailing writer array may be used to write adjoining data tracks for the other direction of tape travel.

Figure 11B:
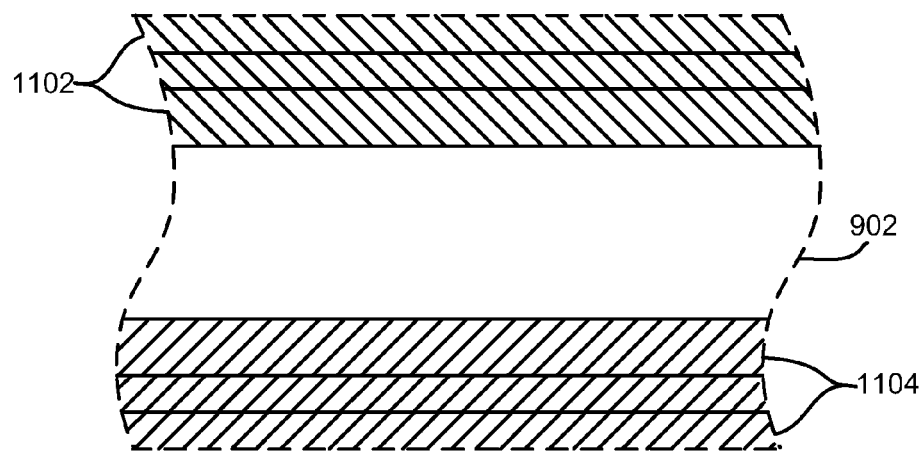
FIG. 11B is a diagram of a tape with shingled tracks written in a serpentine fashion according to one embodiment.

Thus, as illustrated in the representational diagram of FIG. 11B, which is in no way intended to limit the invention, the angles of orientation of the magnetic transitions on the tape 902 may be about the same for shingled data tracks 1102 written in a first direction of tape travel, but different than the angles of orientation of the magnetic transitions in the shingled data tracks 1104 written during the opposite direction of tape travel. This preferably reduces writing errors, readback errors, data loss, etc. and ensures consistency while writing, e.g., by enabling symmetrical servo pattern reading.

According to yet another approach, the arrays may have a RWR configuration as described above, for conducting serpentine writing. While writing data with a RWR configuration, the writer and corresponding trailing reader may preferably be active, while the leading reader is not active, depending on the direction of tape travel. As a result, the same writer may be used to write each adjoining data track for both directions of tape travel, despite reversal thereof while writing.

Referring again to FIGS. 10A-10C, which is in no way intended to limit the invention, the arrays 1004, 1006, 1008 are preferably fixed relative to each other, such that their respective axes 1024, 1028, 1026 are oriented about parallel to each other, respectively (see also FIG. 12). As illustrated in FIGS. 10A-10C, the axes 1024, 1028, 1026 of each array of transducers are represented by the dashed lines that lie between opposite ends thereof, e.g., ends of the array positioned farthest apart.

However, in some embodiments, the relative position of the third array 1006 to the first and second arrays 1004, 1008 may be selectively adjustable in a direction parallel to the longitudinal axis 1028 of the third array 1006 (see offset of FIG. 12). According to one approach, the third array 1006 may be nominally shifted relative to the first and second arrays 1004,

1008. However, in another approach, the first and second arrays 1004, 1008 may be nominally shifted relative to the third array 1006.

Being selectively adjustable in a direction parallel to the longitudinal axis 1028 of the third array 1006 may allow the transducers of the third array to better align with the transducers of the first and/or second arrays at any given angle of orientation. According to one approach, this selective adjustability may preferably allow the already-oriented arrays to compensate for tape lateral expansion and/or contraction, tape skew, shifting of the tape, etc., e.g., experienced during operation of the head.

Depending on the desired embodiment, the third array 1006 itself may be offset (e.g., nominally offset) to effect the shifting of the transducer arrays, as shown by the offset (offset) in FIG. 12. In another approach, the transducer arrays may be positioned on the respective array in a specified position to effect an offset while the arrays themselves are not offset in the drive. Combinations of the foregoing are also possible.

However, offsetting the arrays such that the first and second arrays 1004, 1008 (outer arrays) are offset in the same direction relative to the third array 1006 (central array), goes against conventional wisdom. As a result, the inventors have surprisingly found that offsetting the arrays in this manner actually enables a smaller head envelope, allowing for compatibility with legacy assembly components and/or fixtures, thereby reducing associated cost. The inventors have additionally found that offsetting the arrays in this manner enables symmetrical servo pattern reading, as described above. Symmetrical servo pattern reading is desirable in that it potentially simplifies the decoding of tape skew and tape dimensional changes, since the signals have the same relationship to one another for both intended direction of tape travel.

In yet another approach, the arrays of transducers may include one or more chiplets. According to one approach, one, two or three the arrays of transducers may be in one or more chiplets, which may be thin film structures that are smaller than the array itself, and coupled thereto. A chiplet may include at least one of: a read transducer and a write transducer, or any combination thereof. Moreover, a chiplet is preferably coupled to a carrier, the carrier providing a portion of the tape bearing surface. In different approaches, a chiplet may be coupled to the carrier using an adhesive, an electrostatically dissipative adhesive, or any other coupling mechanism which would be apparent to one skilled in the art upon reading the present description. Moreover, one or more of the chiplets may be longitudinally positioned about perpendicular to the intended direction of tape travel, or at an angle relative thereto. A chiplet may be an independently formed chip that was created separately from the carrier, or a chip formed on the carrier but not extending full span (i.e., the full span of the magnetic tape passing thereacross).

With reference to FIG. 12, the system 1200 includes a mechanism 1202, such as a tape dimensional instability compensation mechanism, for orienting the magnetic head 1002 and its arrays 1004, 1006, 1008, e.g., to control the pitch of the data transducers presented to the tape. 902. The tape dimensional instability compensation mechanism 1202 preferably allows for orienting the arrays while the arrays are reading and/or writing. The tape dimensional instability compensation mechanism 1202 may be any known mechanism suitable for orienting the arrays. Illustrative tape dimensional instability compensation mechanisms 1202 include worm screws, voice coil actuators, thermal actuators, piezoelectric actuators, etc.

With continued reference to FIG. 12, the tape dimensional instability compensation mechanism 1202 may be coupled to a preferably rigid beam 1206 that is attached to the arrays at different locations. As illustrated, the beam 1206 may be attached to the arrays at one end 1208 of the outer arrays 1004, 1008, and at the opposite end 1210 of the inner array 1006, which is nominally shifted.

Moreover, according to an illustrative approach, which is in no way intended to limit the invention, the arrays 1004, 1006, 1008 may have slots 1212 in them and a spring 1214 formed therein by gluing an e.g., metal sheet between the arrays and into the two opposing slots. This technique is described in more detail in U.S. patent application Ser. No. 13/026,142 filed Feb. 11, 2011 to Hamidi et al., which is herein incorporated by reference. As a result, the arrays may preferably be fixed such that their longitudinal axes 1024, 1026, 1028 are oriented about parallel to each other, as explained above.

Referring still to FIG. 12, a controller 1204 may be electrically coupled to the magnetic head. Moreover, the controller may be configured to control the tape dimensional instability compensation mechanism 1202 based on a readback signal of the tape, e.g., servo signals, data signals, a combination of both, etc. As described above, according to different approaches, the controller 1204 may be configured to write data using the head in a non-serpentine and/or serpentine fashion, depending on the desired embodiment. However, in different approaches, the controller may include any approaches described and/or suggested herein, depending on the desired embodiment (see 128 of FIG. 1).

Moreover, in various approaches, the dimensional conditions of the tape and/or titling state of the arrays when the tape was written may be retrieved e.g., from a database, cartridge memory, etc., and the orientation of the arrays may be set based thereon to about match the transducer pitch of the current operation to that of the previous operation.

In various approaches, additional logic, computer code, commands, etc., or combinations thereof, may be used to control the tape dimensional instability compensation mechanism 1202 for adjusting the orientation of the arrays, e.g., based on a skew of the tape. Moreover, any of the embodiments described and/or suggested herein may be combined with various functional methods, depending on the desired embodiment.

Figure 13:
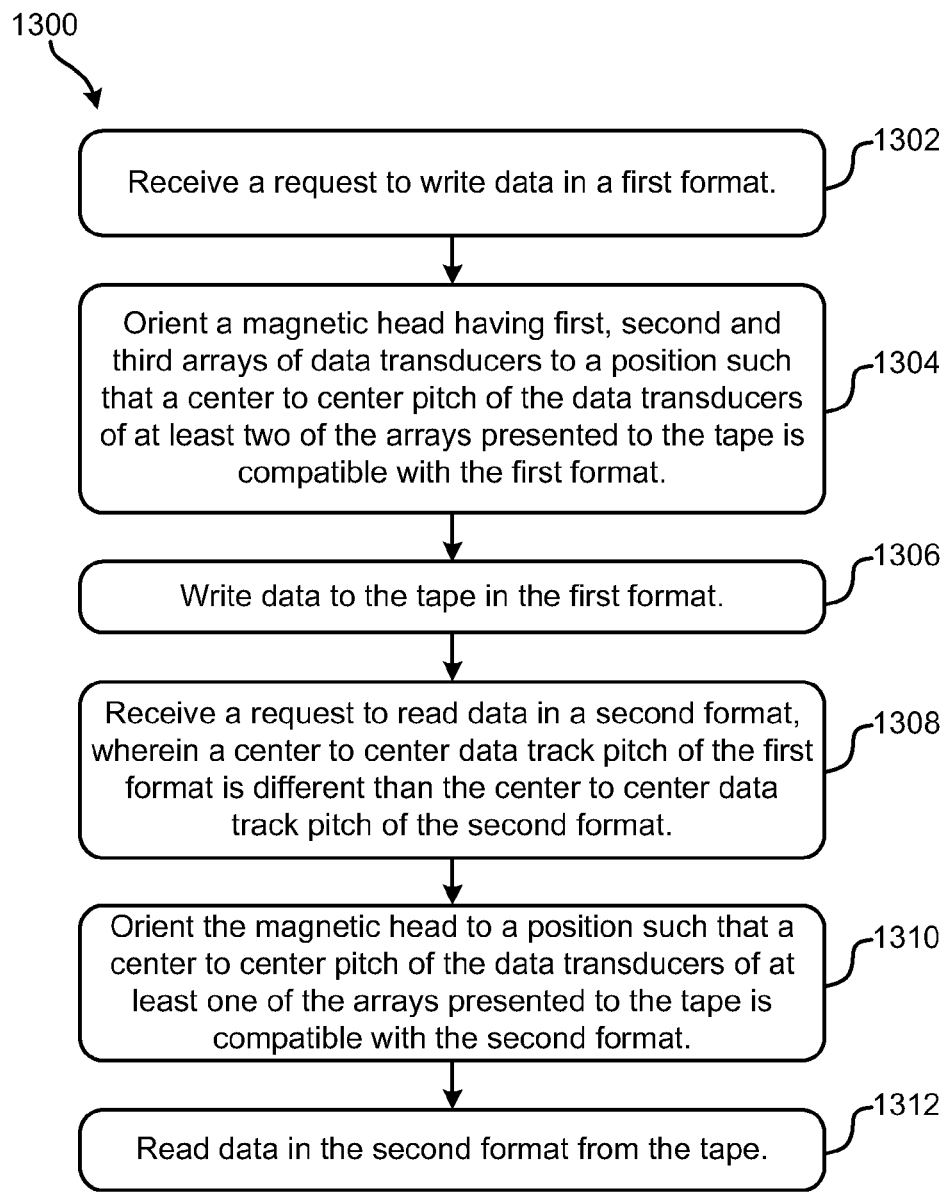
FIG. 13 is a flow chart of a method according to one embodiment.

FIG. 13 depicts a method 1300 for orienting arrays of data transducers, in accordance with one embodiment. In some embodiments, such method 1300 may be implemented by the controller of FIGS. 1 and/or 12. Moreover, in other embodiments, the method 1300 may be implemented in a tape drive, e.g., 100 of FIG. 1A, depending on the desired embodiment.

As an option, the present method 1300 may be implemented in conjunction with features from any other embodiment listed herein, such as those described with reference to the other FIGS. Of course, however, such method 1300 and others presented herein may be used in various applications and/or in permutations which may or may not be specifically described in the illustrative embodiments listed herein. Further, the method 1300 presented herein may be used in any desired environment. Thus FIG. 13 (and the other FIGS.) should be deemed to include any and all possible permutations.

Referring now to FIG. 13, the method 1300 includes receiving a request to write data in a first format. See operation 1302. According to various approaches, the request may have originated from a user, a computing device, a controller, computer program code, an administrator, etc.

The method 1300 additionally includes orienting a magnetic head having first, second and third arrays of data transducers to a position such that a center to center pitch of the data transducers of at least two of the arrays presented to the tape is compatible with the first format. See operation 1304. See, e.g., FIGS. 10B-10C.

Moreover, operation 1306 of the method 1300 includes writing data to the tape in the first format. As described above, with reference to the present description, "compatible" is intended to mean that the center to center pitch of the transducers as presented to the tape is about the same as (i.e., compatible with) the center to center data track pitch of the first format. Moreover, the pitch as presented to the tape is measured perpendicularly to the tape travel direction between imaginary parallel lines extending through the data transducers along the tape travel direction.

With continued reference to FIG. 13, the method 1300 includes receiving a request to read data in a second format, where a center to center data track pitch in the first format is different than the center to center data track pitch of the second format. See operation 1308.

Moreover, operation 1310 includes orienting the magnetic head to a position such that a center to center pitch of the data transducers of at least one of the arrays presented to the tape is compatible with the second format. See, e.g., FIG. 10A. Furthermore, the method 1300 includes reading data in the second format from the tape. See operation 1312. According to a preferred approach, the at least one of the arrays compatible with the second format may have data transducers that are data readers.

As described above, the positioning of the magnetic head in method 1300 may be between a first and second angle of a first position and a second position, e.g., the magnetic head may be oriented at any angle between, and/or at, the first and second angles of the first and second positions respectively, depending on the desired embodiment. Therefore, it should be noted that the positions of the magnetic head and arrays of transducers thereof, described in method 1300, are intended to include any of the approaches described and/or suggested herein. Referring back to the components described in operation 1304, according to a preferred embodiment, the outer data transducers of the second array may be about aligned with the outer data transducers of the third array when the magnetic head is positioned towards the first position, and the outer data transducers of the first array may be about aligned with the outer data transducers of the third array when the magnetic head is positioned towards the second position.

Although three arrays 1004, 1008, 1006 are illustrated in combination in the magnetic head 1002 in FIGS. 10A-12, in other approaches, a magnetic head may include any number of arrays e.g., at least three, at least four, a plurality, etc. depending on the desired embodiment. Moreover, the arrays may be positioned with any orientation relative to each other, depending on the desired embodiment.

Moreover, according to different approaches, with reference to any of the embodiments listed and/or suggested herein, the arrays may be formed in a single, (e.g., monolithic) head. In another approach, which is in no way intended to limit the invention, the arrays may be formed on a common substrate, and may be cut (e.g., separated) depending on the desired embodiment.

It will be clear that the various features of the foregoing systems and/or methodologies may be combined in any way, creating a plurality of combinations from the descriptions presented above.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (e.g., CD-ROM), a Blu-ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fibre, etc.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer, for example through the Internet using an Internet Service Provider (ISP).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart(s) and/or block diagram block or blocks.

It will be further appreciated that embodiments of the present invention may be provided in the form of a service deployed on behalf of a customer.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:
    a magnetic head, the magnetic head having:
        a first array of data transducers;
        a second array of data transducers spaced from the first array; and
        a third array of data transducers positioned between the first and second arrays,
        the magnetic head being positionable between a first position and a second position,
        wherein a longitudinal axis of the third array is oriented at a first angle relative to a line oriented perpendicular to an intended direction of tape travel across the magnetic head when the magnetic head is in the first position,
        wherein the longitudinal axis of the third array is oriented at a second angle relative to the line oriented perpendicular to the intended direction of tape travel when the magnetic head is in the second position,
        wherein a pitch of the data transducers of at least two of the arrays presented to the tape is compatible with a first format when the magnetic head is positioned between the first and second positions,
        wherein the pitch of the data transducers of at least one of the arrays is compatible with a second format when the longitudinal axis of the third array is oriented about perpendicular to the intended direction of tape travel,
        wherein a data track pitch of the first format is different than the data track pitch of the second format.

2. An apparatus as recited in claim 1, wherein the longitudinal axes of the arrays are nominally oriented about parallel to each other, wherein the first and second arrays of data transducers are offset from the third array of data transducers in a direction along the longitudinal axes thereof.

3. An apparatus as recited in claim 1, wherein the data transducers of the first and second arrays are writers, wherein the data transducers of the third array are readers.

4. An apparatus as recited in claim 1, wherein the data transducers of the first and second arrays are readers, wherein the data transducers of the third array are writers.

5. An apparatus as recited in claim 1, further comprising a mechanism for orienting the magnetic head to control the pitch of the data transducers presented to the tape.

6. An apparatus as recited in claim 1, wherein data transducers of the third array are about aligned with data tracks written in the first format when the magnetic head is positioned toward the first position and when the magnetic head is positioned toward the second position.

7. An apparatus as recited in claim 6, wherein outer data transducers of the second array are about aligned with the outer data transducers of the third array when the magnetic head is positioned towards the first position, wherein the outer data transducers of the first array are about aligned with the outer data transducers of the third array when the magnetic head is positioned towards the second position.

8. An apparatus as recited in claim 1, wherein the longitudinal axis of the third array is oriented about perpendicular to the intended direction of tape travel when the magnetic head is in the first position.

9. An apparatus as recited in claim 1, wherein the data transducers of the at least one of the arrays having the pitch that is compatible with the second format when the longitudinal axis of the third array is oriented about perpendicular to the intended direction of tape travel are data readers.

10. An apparatus as recited in claim 1, further comprising:
    a drive mechanism for passing a magnetic tape over the magnetic head; and
    a controller electrically coupled to the magnetic head.

11. A method, comprising:
    receiving a request to write data in a first format;
    orienting a magnetic head having first, second and third arrays of data transducers to a position such that a pitch of the data transducers of at least two of the arrays presented to a tape is compatible with the first format;
    writing data to the tape in the first format;
    receiving a request to read data in a second format, wherein a data track pitch of the first format is different than the data track pitch of the second format;
    orienting the magnetic head to a position such that a pitch of the data transducers of one of the arrays presented to the tape is compatible with the second format; and
    reading data in the second format from the tape.

12. A method as recited in claim 11, wherein the data transducers of the first and second arrays are writers, wherein the data transducers of the third array are readers.

13. A method as recited in claim 11, wherein the data transducers of the first and second arrays are readers, wherein the data transducers of the third array are writers.

14. A method as recited in claim 11, wherein the third array is positioned between the first and second arrays, wherein the magnetic head is positionable between first and second positions, wherein the data transducers of the third array are about aligned with data tracks written to the tape when the magnetic head is in the first and second positions, wherein a longitudinal axis of the third array is oriented at a negative angle relative to a line oriented perpendicular to an intended direction of tape travel across the magnetic head when the magnetic head is in the first position, wherein the longitudinal axis of the third array is oriented at a positive angle relative to the line oriented perpendicular to the intended direction of tape travel when the magnetic head is in the second position.

15. A method as recited in claim 14, wherein outer data transducers of the second array are about aligned with the outer data transducers of the third array when the magnetic head is positioned towards the first position, wherein the outer data transducers of the first array are about aligned with the outer data transducers of the third array when the magnetic head is positioned towards the second position.

16. A method as recited in claim 11, wherein a longitudinal axis of the third array is oriented about perpendicular to an intended direction of tape travel when the magnetic head is reading data in the second format.

\* \* \* \* \*